April 7, 1936.　　　　C. WHITE ET AL　　　　2,036,665
VALVE SEAT PULLER
Filed Dec. 26, 1934　　　　2 Sheets-Sheet 1
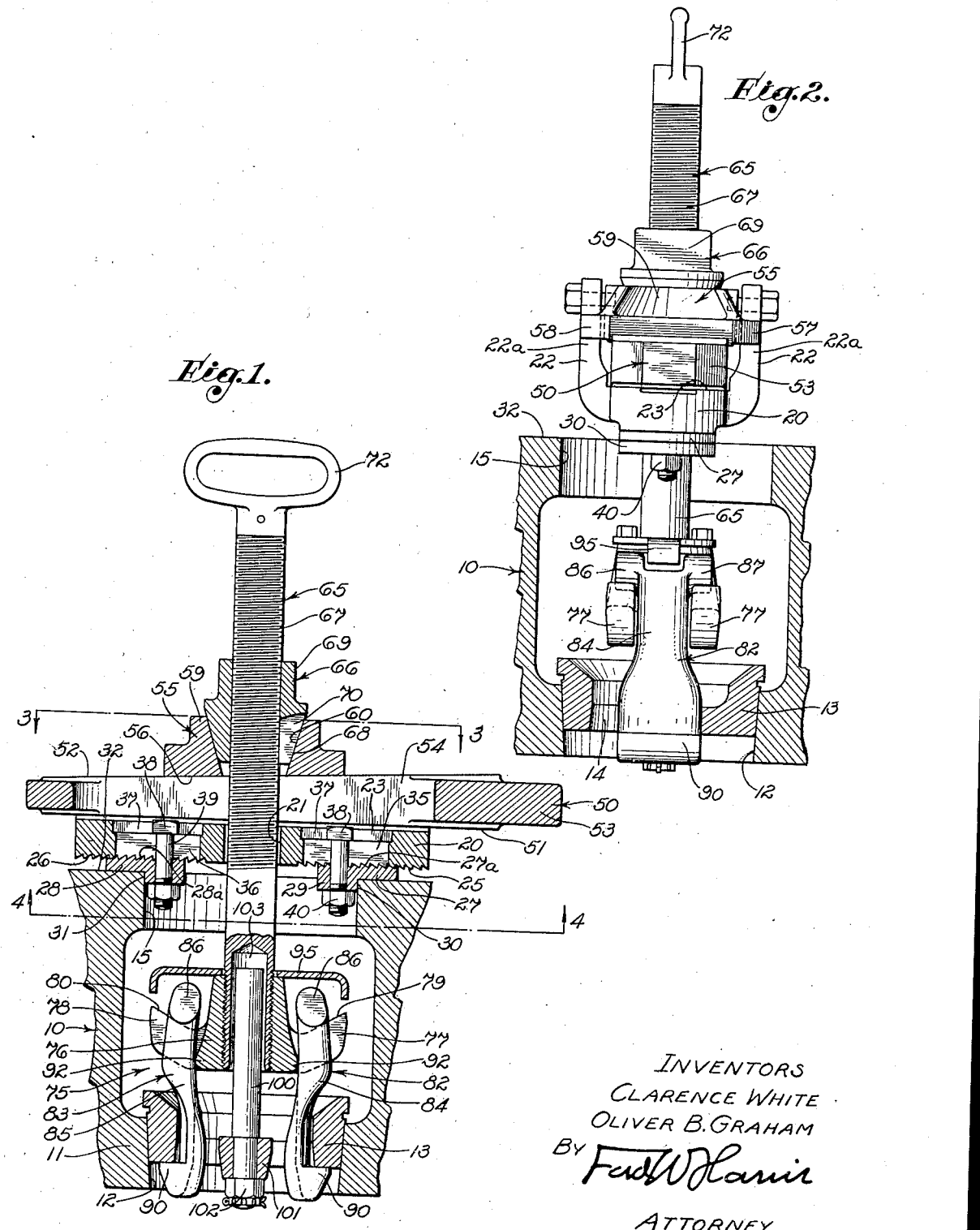
INVENTORS
CLARENCE WHITE
OLIVER B. GRAHAM
By Fred W. Harris
ATTORNEY.

April 7, 1936.　　　C. WHITE ET AL　　　2,036,665

VALVE SEAT PULLER

Filed Dec. 26, 1934　　　2 Sheets-Sheet 2

INVENTORS
CLARENCE WHITE
OLIVER B. GRAHAM
BY *Fad W Hanis*

ATTORNEY.

Patented Apr. 7, 1936

2,036,665

UNITED STATES PATENT OFFICE 2,036,665

VALVE SEAT PULLER

Clarence White, Walnut Park, and Oliver B. Graham, Los Angeles, Calif., assignors to Oil Well Manufacturing Corporation, Los Angeles, Calif., a corporation of California Application December 26, 1934, Serial No. 759,208

11 Claims. (Cl. 29—88.2)

Our invention relates to devices for pulling an insert member from a bore. The various equivalent embodiments of the invention are adapted for pulling liners and various pieces of valve equipment from oil-well pump tubing, and for pulling the liners from the bore of a slush pump. It is particularly adapted for pulling insert valve seats from slush pumps, and it is in this connection that we have illustrated the device in the drawings. It should be understood, however, that we do not intend the scope of the invention to be limited to use in connection with slush pumps, this embodiment being chosen merely for purposes of illustration and description.

In the operation of slush pumps, due to the hammering action on the valve seat and also due to the taper on the outside of the seat, the valve seat becomes so wedged in the bore of the valve deck that it is sometimes extremely difficult to remove.

It is one of the objects of our invention to provide a device operable from the exterior of a body, such as a slush pump, to engage an insert member in a bore within the body, such as a removable valve seat, the device being operable to exert forces sufficient to break the valve seat loose from the bore in which it is inserted.

It is another object of our invention to provide a device as mentioned above which includes engaging means automatically operable to grasp the valve seat, means operable from the exterior of the pump to exert a pulling strain on the seat, and means for exerting a jarring force on the valve seat while the pulling strain is being exerted.

It is also an object of our invention to provide a device of the character described above having a head plate adapted to extend across the bore on the exterior of the pump, this head plate including adjustment means engaging the walls of various sizes of bores to centralize the working parts of the device, carried by the head plate, in the hole.

It is an object of the invention to provide a grasping means carried by a longitudinally movable stem extending into the bore, the grasping means including a plurality of lifters operable to laterally retract for entrance into the orifice of the valve seat, and operable by the longitudinal movement of the stem to laterally expand into engagement with the valve seat for pulling the seat from the bore.

It is likewise an object of the invention to provide a device as described in the above paragraph having a plurality of lifters operable by the longitudinal movement of the stem to expand with progressively increasing force against the valve seat when a progressively increasing force is applied to the stem to move the stem out of the bore, so that the valve pulling device is positive in action and no slippage of the lifters from the valve seat occurs.

Another object of the invention resides in the provision of an engaging mechanism including a plurality of lifters capable of contracting to pass through orifices of varying diameter in different sizes of valve seats without adjustment.

It is still another object of the invention to provide a device of the character described which is adjustable to operate on slush pumps, or the like, having varying distances between the valve seats and the entrance of the bores in which the valves are inserted.

These and other objects will be apparent from a perusal of the following part of the specification in connection with the accompanying drawings and the appended claims.

In the drawings,

Fig. 1 is a longitudinal section through the device taken on a median plane with parts thereof shown in elevation.

Fig. 2 is a side elevation of the device, with a fragmentary portion of a pump body and a valve seat in connection with which the device is illustrated, shown in section.

Figure 3:
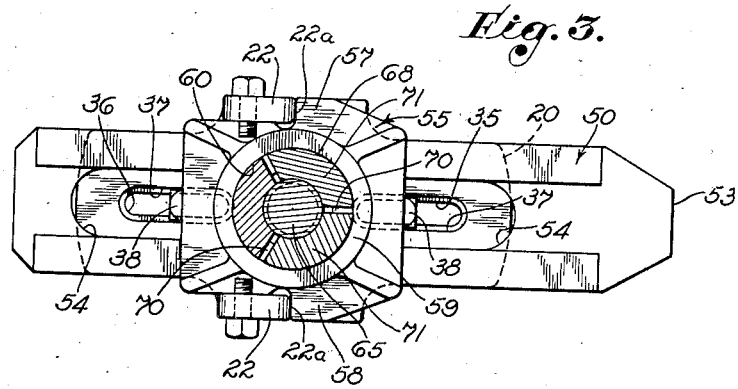
Fig. 3 is a horizontal section taken through the upper portion of the device as indicated by the line 3—3 of Fig. 1, the main portions of the device being shown in plan.

With reference to Figs. 1 and 2 of the drawings, we show the device positioned for the operation of pulling a removable valve seat from a slush pump, and in this connection the numeral 10 indicates the valve body, 11 indicates the valve deck having a bore 12 therein, 13 indicates the insert valve seat having the usual orifice 14 therein, and 15 indicates the top hole in the pump body above the valve. For the purpose of simplicity in the description, the bore 12 and the top hole 15 will hereinafter be referred to as the bore of the pump, and the removable valve seat 13 will hereinafter be referred to as the insert member.

Figure 4:
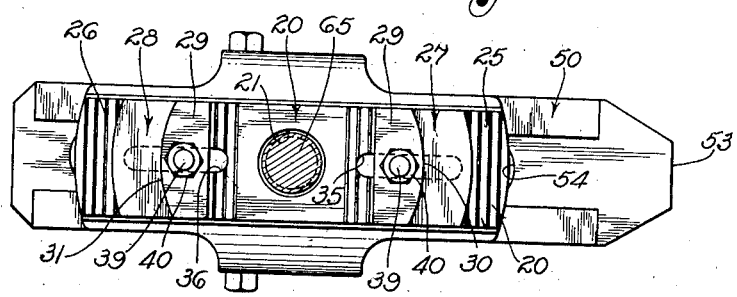
Fig. 4 is a horizontal section taken as indicated by the line 4—4 of Fig. 1.
Figure 5:
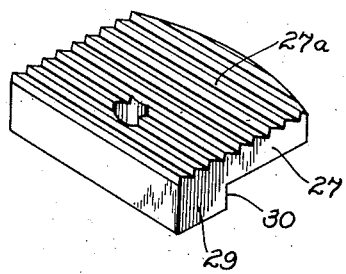
Fig. 5 is a perspective view of one of a plurality of adjusting slips included in the device.

Coming now to a description of our valve pulling device, we show a head plate 20 comprising essentially a heavy flat plate, preferably rectangular in form, provided with a central vertical opening 21. Formed integrally with the plate 20 on each side thereof is an upward extending arm 22, each providing a vertically disposed abutment face 22a, which faces are aligned in a plane extending through the central axis of the bore 21 and perpendicular to the longitudinal axis of the plate 20 substantially as shown in Figs. 2 and 3. The upper face of the head plate 20 provides a smooth horizontal surface 23, while the lower face is provided with notched surfaces 25 and 26 extending from opposite ends of the head plate to points adjacent the central opening 21. These notched surfaces 25 and 26 are preferably formed by a series of continuous saw-tooth notches, the teeth of the surface 25 being oppositely disposed from the teeth of the surface 26, substantially in the manner shown. Engaging the surfaces 25 and 26 is shown a pair of slip members 27 and 28, the body portions thereof comprising substantially flat plates, the upper surfaces of which are respectively provided with teeth or notches 27a and 28a, conforming to the notched surfaces 25 and 26 of the plate 20. Each of these slip members is provided at one end thereof with a downward extending shoulder 29, the inner surfaces 30 and 31 thereof being arcuated, as best shown in Fig. 4. The body portions of the slip members rest on the upper surface 32 of the pump and the shoulder portions 29 extend downward into the bore 15 with the arcuate surfaces 30 and 31 engaging the walls defining the bore 15, substantially as shown. Provided in the head plate 20 is a pair of longitudinally extending slots 35 and 36 disposed on opposite sides of the central opening 21, the upper portion of these slots being widened, as best shown at 37 in Figs. 1 and 3, for the reception of heads 38 of a pair of bolts 39 which extend downward through the slots 35 and 36 and through openings provided in the shoulder portions 29 of the slip members 27 and 28, as shown, there being nuts 40 threadedly engaging the lower ends of the bolts to clamp the slip members 27 and 28 respectively in definite positions relative to the central opening 21 of the head plate.

The above described notched surfaces 25 and 26, the slip members 27 and 28, the slots 35 and 36, and the bolts 39 comprise a means of the invention for centralizing the head plate 20 in definite relationship with respect to the central axis of bores of varying diameters.

Slidably positioned on the upper surface 23 of the head plate 20 is a wedge member 50 having a flat lower surface 51 and a tapered upper surface 52. Provided on the thicker end of the wedge 50, as shown, is a driving head 53 provided for a purpose to be hereinafter described. The wedge 50 is provided with a longitudinally extending slot 54 which extends substantially the entire length of the wedge. Resting on the tapered upper surface 52 of the wedge 50 is a pressure plate 55 having a lower tapered surface 56, which taper is of substantially the same angularity as the tapered surface 52. The pressure plate 55, as shown best in Fig. 3, is of such a width as to be received between the upward extending arms 22 of the head plate 20, and has a pair of outward extending wing portions 57 and 58 disposed on opposite sides thereof which engage the abutment faces 22a of the arms 22, substantially in the manner shown for the purpose of aligning the pressure plate 55 relative to the head plate 20. The pressure plate 55 is provided with a central upward extending portion 59 in which is formed a central tapered socket 60 which extends entirely through the pressure plate, as best shown in Fig. 1.

Extending through the socket 60, the slot 54 of the wedge 50, and the central opening 21 of the head plate 20 is an elongated stem 65, which, when the device is positioned for operation on a pump body, extends into the bore 15 as shown in the drawings.

Our invention includes a means for imparting longitudinal movement to the stem 65. One suitable means for imparting this longitudinal movement to the stem comprises a nut 66 adapted to engage threads 67 provided on the stem 65 for a considerable length thereof; the nut 66 having a lower conical portion 68 adapted to seat in the socket 60, the taper of the conical portion 68 being slightly less than the taper of the socket 60, and a squared head portion 69. As best shown in Figs. 1 and 3, the lower tapered portion 68 of the nut 66 is provided with a plurality of kerfed slots 70 cooperating to provide flexible portions 71 on the conical part 68 of the nut 66 for a purpose to be hereinafter described.

Provided on the extreme upper end of the stem 65 is a handle 72 provided for convenience in handling the device when positioning for operation or for a rapid turning of the stem 65 through the nut 66 when adjusting the stem to the desired position for installation on pumps having varying distances between the top surface of the pump and the valve to be pulled.

Our invention also includes a grasping means comprising a mechanism carried by the stem 65 and including a plurality of lifters contractible to pass through the orifice 14 in the seat 13 and operable by a longitudinal movement of the stem 65 outward in the bore to engage the seat 13 for pulling the same from the bore. One form of this mechanism, generally designated in Figs. 1 and 2 by the numeral 75, comprises a hanger block 76 threaded or otherwise secured to the lower end of the stem 65 on which is provided, on two opposite sides thereof, hanger members in the form of relatively spaced pairs of laterally extending ears 77 and 78. These oppositely disposed pairs of ears 77 and 78 are formed to provide on each side of the block 76 relatively spaced cam surfaces 79 and 80, which are inclined downward and inward from the outer ends thereof toward the body of the block 76. Swingably depending from the hanger members 77 and 78 is a pair of lifters 82 and 83 providing intermediate body portions 84 and 85 extending between the pairs of ears 77 and 78, there being provided on the upper end of each of the lifters a pair of laterally projecting lugs 86 and 87 which slidably engage the cam surfaces 79 of the hanger members 77 and 78. The lugs 86 and 87 will hereinafter be referred to as the hanger elements of the invention, and they cooperate with the hanger members 77 and 78 in a manner which will hereinafter be described. Provided on the lower end of each of the lifters 82 and 83 is a grasping portion in the form of an outward facing hook 90.

Fulcrum points are provided to engage the lifters 82 and 83 at intermediate points between the upper hanger elements and the lower hook portions for the purpose of causing the upper and lower ends of the lifters 82 and 83 to move laterally in opposite directions when lateral movement is imparted to either end of these lifters. These fulcrum points might be conveniently formed, as illustrated best in Fig. 1, by providing the body of the block 76 with outward extending portions 92 between each of the pairs of ears 77 and 78 which engage the intermediate body portions of the lifters 82 and 83 substantially in the manner shown so that the upper and lower ends of the lifters are free to swing around these fulcrum points.

Carried on the stem above the hanger block 76 is a guard plate 95 which extends outward over the hanger members and the hanger elements in substantially the manner shown for the purpose of preventing the lugs 86 and 87 from becoming disengaged from the cam surfaces 79.

In the operation of our device when positioning the device for pulling a valve from the bore in the valve deck of a slush pump, the cover plate is first removed from the top hole of the pump and the valve mechanism of the pump removed therethrough. The diameter of the top hole or bore in the pump body is then determined and the slips 27 and 28 are adjusted laterally with respect to the center of the opening 21 in the head plate so that the right-angled surfaces 30 and 31 fit the wall of the bore 15 to prevent lateral movement of the head 20 relative to the central axis of the bore, the bolts 39 of course being tightened to prevent relative lateral movement between the slips and the head after the adjustment has been made.

The wedge 53 is then moved into its extreme rightward position so that the thinner end of the wedge is adjacent the stem 65 and then the stem is adjusted longitudinally, as by turning the stem by means of the handle 72 or by rotation of the nut 66, so that the position of the grasping mechanism 75 with relation to the head plate 20 is such that the lifters 82 and 83 may pass entirely through the orifice 14 in the valve seat 13 when the head plate is placed upon the pump body as before described.

It will be clearly understood that because the lugs 86 and 87 are free to move laterally inward and outward on the cam surfaces 79, the lower hook portions 90 will be free to swing inward into collapsed position when they engage the upper tapered portion of the valve seat 13 as they are lowered into the bore, the substantially balanced normal depending position of the lifters 82 and 83 being such that when the hook portions 90 have passed completely through the orifice 14, the lower ends of the lifters tend to swing outward so that the hook portions 90 engage the lower surface of the valve seat 13 substantially in the manner indicated in Fig. 1.

Certain types of slush pump valve seats are provided with valve guides, such as the seat illustrated in Fig. 1, and which comprises a guide stem or pin 100 extending upward from a central hub 101 formed integrally with the seat, the pin being secured to the hub usually by a nut 102 substantially in the manner shown. In valves of this type it is impossible to remove the pin 100 from the seat before the seat is removed from the bore. For operation upon this type of valve seat we have found it desirable to recess the lower end of the stem 65 as shown at 103 in Fig. 1, so that the pin 100 may project into the recess when the grasping mechanism is lowered to engage the hook portion 90 with the seat.

After the lifters of the engaging mechanism 75 have been passed through the orifice of the valve seat as just described, the nut 66 is rotated to draw upward on the stem 65 exerting a pulling force on the valve seat, the inward and downward sloping cam surfaces 79 tending to force the upper ends of the lifters 82 and 83 inward and thus tending, by reason of the engagement of the lifters with the fulcrum points 92 to force the grasping portions outward into engagement with the valve seat with a progressively increasing force as a progressively increasing pulling force is imparted to the stem by reason of being threaded through the nut 66.

As the pulling force on the stem 65 is increased the tapered portion 68 of the nut 66 is seated firmly in the socket 60 of the pressure plate 55, and by reason of the difference in the taper of the portion 68 and the socket the flexible portions 71 of the nut are forced inward into tight relationship with the threads of the stem, thus utilizing the fullest possible area of the threads to prevent the stripping thereof under the great stress placed thereon. The use of the kerfed nut 66 in combination with the socket 60 which accomplishes the function set forth above is a desirable feature of the invention. However, it should be understood that we do not wish to be limited to this particular type of nut, the primary purpose of the nut 66 in combination with the stem 65 and the head plate 55 being to produce longitudinal movement of the stem 65 in the bore.

When the nut 66 has been threaded downward on the stem 65 to such an extent that it exerts the fullest practical upward force on the valve seat, the wedge 53 may be driven leftward, as by striking the driving head 53 thereof with a sledge, which imparts a jarring action in an upward direction to the valve seat, breaking the seat loose from the bore 12 so that it may be easily withdrawn therefrom. It is, of course, understood that when the insert member being pulled from the bore is greatly elongated so that the upward movement of the stem due to the action of the wedge in spreading the head plate 20 and the pressure plate 55 is inadequate to completely release the pressure member, the wedge may be again moved rightward and the nut 66 again threaded downward on the stem to exert the pulling force, whereupon the wedge may be again driven leftward as before described.

It will be clear from the foregoing description that our invention embodies a device for pulling insert members such as pump cylinder liners or removable valve seats from their bores, which combines the desirable features of: strength to withstand the great stress put upon the device when pulling insert members which are frozen in their bores; positiveness of action so that no slipping occurs after the lifters have taken hold of the insert member; automatically adjustable for grasping various sizes of inserts for the reason that the lifters of the device tend to spread outward whenever a pulling force is exerted on the stem; adjustable for centralizing the working parts of the device relative to various sizes of bores; and adjustable for operation where the distance between the outer end of the bore and the insert to be pulled varies in different installations.

Although we have herein illustrated and described only one complete embodiment of the invention, it should be understood that we are aware of various modifications that might be made and numerous features that might be changed without departing from the spirit and scope of the invention as interpreted by the appended claims.

We claim as our invention:

1. In a device for pulling an insert member from a bore provided in a body, the combination of: a head plate supported on said body and extending across said bore; a stem extending into said bore; means associated with said stem and said head plate for imparting longitudinal movement to said stem; adjustable means associated with said head plate and engaging walls defining said bore for centralizing said stem in said bore; an engaging mechanism carried by said stem for grasping said insert; and wedge means operable between said first-named means and said head plate for jarring said stem longitudinally in said bore when said wedge is driven laterally.

2. In a device for pulling an insert member from a bore provided in a body, the combination of: a head plate supported on said body and extending across said bore; a stem extending through an opening formed in said head plate and into said bore; means adjustably fixed to said head plate and engaging walls defining said bore for adjusting said head plate laterally with respect to said bore to centralize said stem therein; a nut threadedly engaging said stem and associated with said head plate for imparting longitudinal movement to said stem; an engaging mechanism carried by said stem for grasping said insert; and wedge means operable between said nut and said head plate for jarring said stem longitudinally in said bore when said wedge is driven laterally.

3. In a device for pulling an insert member from a bore provided in a body, the combination of: a pair of slip members formed to engage the adjacent walls defined by said bore and the outer surface of said body; a head plate supported by said slip members; means for adjustably fixing said head plate to said slip members in various lateral positions with respect to said bore; a stem extending through an opening formed in said head plate and into said bore; a nut threadedly engaging said stem and associated with said head plate for imparting longitudinal movement to said stem; an engaging mechanism carried by said stem for grasping said insert; and wedge means operable between said nut and said head plate for forcing said stem longitudinally in said bore when said wedge is driven laterally.

4. In a device for pulling an insert member from a bore provided in a body, the combination of: a pair of slip members formed to engage the adjacent walls defined by said bore and the outer surface of said body; a head plate supported by said slip members; means for adjustably fixing said head plate to said slip members in various lateral positions with respect to said bore; walls forming an opening in said head plate; a stem extending through said opening and into said bore; a pressure plate having walls forming a socket therein through which said stem extends; a wedge positioned between said head plate and said pressure plate and having walls forming an elongated slot through which said stem extends; a nut seated in said socket and threadedly engaging said stem for imparting longitudinal movement to said stem; and an engaging mechanism carried by said stem for grasping said insert, said wedge being operable to force said stem longitudinally in said bore when said wedge is driven laterally.

5. In a device for pulling an insert member from a bore, the combination of: a stationary supporting head extending across said bore; mechanism supported by said head to extend into said bore and including grasping members operable to engage said insert member; means operable to continuously exert a pulling force through said grasping members on said insert member; and means operable separately from said first named means to exert a jarring force through said grasping members on said insert member while said pulling force is being exerted by said first named means.

6. In a device for pulling an insert member from a bore, the combination of: a stationary supporting head extending across said bore; a stem extending into said bore; grasping means carried by said stem for engaging said insert member; operating means associated with said head and said stem for moving said stem longitudinally to continuously exert a pulling force on said insert member; and a jarring means associated with said head and said stem and operable separately from said operating means to exert a jarring force through said stem on said insert while said pulling force is being exerted.

7. In a device for pulling an insert member from a bore provided in a body, the combination of: a head plate supported on said body and extending across said bore; a stem extending into said bore; means associated with said stem and said head plate for imparting longitudinal movement to said stem; means adjustably fixed to said head plate and engaging walls defined by said bore for adjusting said head plate laterally with respect to said bore to centralize said stem therein; and an engaging mechanism carried by said stem for grasping said insert.

8. In a device for pulling an insert member from a bore formed in a body, the combination of: a pair of slip members formed to engage walls defining said bore; a head plate supported by said slip members; means for adjustably fixing said head plate to said slip members for lateral adjustment with respect to said bore; a stem extending into said bore; means associated with said stem and said head plate for supporting and moving said stem in said bore; and an engaging mechanism carried by said stem for grasping said insert member.

9. In a device for pulling an insert member from a bore, the combination of: an apertured head plate adapted for extending across said bore; a stem extending through said apertured head plate and into said bore; engaging mechanism carried by said stem for grasping said insert member; a pressure plate having walls forming a tapered socket through which said stem extends; a laterally movable wedge between said head plate and said pressure plate; and a nut threadedly engaging said stem and having a plurality of internally threaded fingers engaging said tapered socket when said nut is threaded on said stem whereby the threads of said fingers are pressed tightly upon the threads of said stem to prevent stripping of said threads when said wedge is driven laterally to jar said insert loose from said bore.

10. In a device for pulling an insert member from a bore, the combination of: a supporting head; a stem supported exclusively by said head and extending into said bore; hanger members on said stem comprising relatively spaced pairs of ears forming lateral cam surfaces; lifters disposed between said pairs of ears, said lifters having upper lug portions engaging said spaced cam surfaces for suspending said lifters and having lower grasping portions; fulcrum portions engaging said lifters whereby lateral movement of said lug portions on said cam surfaces, when said stem is moved longitudinally, is imparted to said grasping portions; and a guard member provided on said stem above said cam surfaces for limiting the lateral movement of said lug portions and against which said lug portions abut when said lifters are pushed through an opening in said insert member.

11. In a device for pulling an insert member from a bore, the combination of: a supporting head; a stem supported exclusively by said head and extending into said bore; means associated with said head and said stem for moving said stem longitudinally in said bore; and an engaging mechanism including hanger members on said stem forming relatively spaced lateral cam surfaces, lifters each disposed between two of said cam surfaces, said lifters having upper hanger elements engaging said two cam surfaces for movement thereon and having lower grasping portions adapted to engage said insert, said grasping portions being beveled for automatic retraction when pushed into an opening in said insert, fulcrum portions engaging said lifters to impart lateral movement to said grasping portions when said hanger elements are moved laterally by said cam surfaces upon longitudinal movement of said stem, and a guard member on said stem above said cam surfaces for limiting the lateral movement of said hanger elements on said cam surfaces and against which said hanger elements abut when said lifters are pushed through said opening in said insert member.

CLARENCE WHITE.
OLIVER B. GRAHAM.